(12) United States Patent
Maeda et al.

(10) Patent No.: US 7,591,580 B2
(45) Date of Patent: Sep. 22, 2009

(54) LIGHTING DEVICE

(75) Inventors: Satoshi Maeda, Kawasaki (JP);
Hirokazu Aritake, Kawasaki (JP);
Takao Satake, Yokohama (JP); Susumu Fujiwara, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/252,720

(22) Filed: Oct. 16, 2008

(65) Prior Publication Data

US 2009/0040789 A1    Feb. 12, 2009

Related U.S. Application Data

(63) Continuation of application No. PCT/JP2006/308842, filed on Apr. 27, 2006.

(51) Int. Cl.
*F21V 7/04* (2006.01)
*G02F 1/1335* (2006.01)
*G02B 27/10* (2006.01)

(52) U.S. Cl. .............. 362/625; 362/615; 362/621; 362/331; 362/612; 349/62; 349/65; 359/619

(58) Field of Classification Search ............ 362/615, 362/620, 623, 625, 339, 611, 612, 331
See application file for complete search history.

(56) References Cited

U.S. PATENT DOCUMENTS

| | | | |
|---|---|---|---|
| 5,394,255 A * | 2/1995 | Yokota et al. ............ 349/64 |
| 6,585,356 B1 | 7/2003 | Ohkawa | |
| 6,598,987 B1 | 7/2003 | Parrika | |
| 6,648,486 B2 * | 11/2003 | Harbers et al. ............ 362/613 |
| 7,210,836 B2 * | 5/2007 | Sasagawa et al. .......... 362/606 |
| 7,246,932 B2 * | 7/2007 | Burtsev et al. ............ 362/616 |
| 7,396,150 B2 * | 7/2008 | Ogawa et al. ............ 362/607 |
| 7,510,308 B2 * | 3/2009 | Goto ...................... 362/330 |
| 2004/0264911 A1 | 12/2004 | Toeda et al. | |
| 2005/0174803 A1 | 8/2005 | Hayashi et al. | |
| 2006/0001974 A1 * | 1/2006 | Uehara et al. ............ 359/619 |

FOREIGN PATENT DOCUMENTS

| | | |
|---|---|---|
| JP | 2001-66590 A | 3/2001 |
| JP | 2003-279753 A | 10/2003 |
| JP | 2004-6326 A | 1/2004 |
| JP | 2004-503808 A | 2/2004 |
| JP | 2005-71610 A | 3/2005 |

OTHER PUBLICATIONS

International Search Report of PCT/JP2006/308842, date of mailing May 30, 2006.

* cited by examiner

*Primary Examiner*—Ali Alavi
(74) *Attorney, Agent, or Firm*—Westerman, Hattori, Daniels & Adrian, LLP.

(57) ABSTRACT

In the lighting device, cylindrical lenses are provided on a reflection surface side of a light guide plate, and the adjacent cylindrical lenses are connected by a concaved curved surface.

21 Claims, 17 Drawing Sheets

CONVENTIONAL EXAMPLE

DARK　　BRIGHT

FIRST EMBODIMENT

DARK　　BRIGHT

PLANAR PORTION: 5%

PLANAR PORTION: 50%

LIGHTING DEVICE

CROSS-REFERENCE TO RELATED APPLICATIONS

This application is a continuation of prior International Patent Application No. PCT/JP2006/308842, filed on Apr. 27, 2006, the entire contents of which are incorporated herein by reference.

FIELD

The embodiments discussed herein are related to a lighting device that one or multiple light sources are arranged near an end surface of a light guide plate.

BACKGROUND

Liquid crystal display devices are thin and light-weighted and require small power consumption. Accordingly, liquid crystal display devices are widely used in electric devices such as mobile phones and personal digital assistants (PDA). In the liquid crystal display devices used in these electric devices, a lighting device, which is generally referred to as a backlight, is provided.

FIG. 1 is a schematic view depicting one example of a conventional liquid crystal display device (transmission-type liquid crystal display device). As depicted in FIG. 1, the transmission-type liquid crystal display device includes a liquid crystal panel 10 and a backlight 20 arranged on the back surface side of the liquid crystal panel 10.

The liquid crystal panel 10 is formed by enclosing a liquid crystal 12 between two transparent substrates 11a and 11b. In addition, a polarizer 13a is arranged on the front surface side (upper side in FIG. 1) of the liquid crystal panel 10 and a polarizer 13b is arranged on the back surface side thereof (lower side in FIG. 1).

The backlight 20 includes a light emitting diode (LED) 21 serving as a light source, a light guide plate 22, a reflection sheet (mirror or white sheet) 23, and a prism sheet 24. The LED 21 is arranged on one end surface (light-entering surface) side of the light guide plate 22. In general, three or four LEDs 21 are used in a 2-inch liquid crystal panel.

The light guide plate 22 is formed of a transparent resin so that the cross-section thereof is a wedge shape as depicted in FIG. 1. The reflection sheet 23 is arranged on the back surface side of this light guide plate 22, and the prism sheet 24 is arranged on the front surface side (liquid crystal panel 10 side). In the following description, the back surface and front surface of the light guide plate 22 are respectively referred to as a reflection surface and a light-outgoing surface.

In the liquid crystal display device configured as described above, light emitted from the LED 21 enters the light guide plate 22 from an end surface (light-entering surface) of the light guide plate 22. The incident light is repeatedly reflected between the two surfaces (reflection surface and light-outgoing surface) facing to each other in the thickness direction of the light guide plate 22 and finally is outputted from the light-outgoing surface to the outside of the light guide plate 22. The prism sheet 24 refracts the light outputted from the light guide plate 22 in a direction substantially perpendicular to the light-outgoing surface of the light guide plate 22.

In general, a pixel electrode is formed for each pixel on one of the two transparent substrates 11a and 11b configuring the liquid crystal panel 10, while a common electrode facing to the corresponding pixel electrode and a color filter are formed on the other substrate. When the light emitted from the backlight 20 passes through the polarizer 13b arranged on the back surface side of the liquid crystal panel 10, the light becomes linearly polarized light. When a voltage is applied between the pixel electrode and the common electrode, a phase of the light passing through the liquid crystal 12 changes according to the voltage. Thereby, an amount of the light transmitting through the polarizer 13a on the front surface side can be controlled. By controlling the transmission amount of the light for each pixel, a desired image or character can be displayed on the liquid crystal display device.

In the transmission-type liquid crystal display device, it is preferable that the entire surface of the liquid crystal panel 10 is uniformly irradiated with the light emitted from the backlight 20. For this reason, in some transmission-type liquid crystal display devices, fine unevenness is provided on a reflection surface and a light-outgoing surface of the light guide plate 22 to diffuse light more uniformly.

As described above, a general transmission-type liquid crystal display device requires a lighting device (backlight). In contrast, a reflection-type liquid crystal display device does not need a lighting device because it performs display by use of reflection of natural light or illumination light. However, even some of such reflection-type liquid crystal display devices include a lighting device, which is referred to as a front light, on a front surface side of a liquid crystal panel, because a screen becomes hardly visible when an ambient condition becomes dark. Similarly to the backlight, the front light is also formed of a light guide plate and a light source arranged around an end surface of the light guide plate.

In the meantime, as depicted in FIG. 2, in a conventional lighting device for a liquid crystal display device, there may occur uneven brightness in which streak portions diagonally extending from the end surface on the side on which a light source is arranged become brighter than the other portions. This uneven brightness is caused by the following reasons.

To be more specific, as depicted in a perspective view in FIG. 3A, multiple cylindrical lenses 25, each extending in the length direction (Y-axis direction depicted in FIG. 3A) of the light guide plate 22, are generally arranged on a reflection surface of the light guide plate 22. These cylindrical lenses 25 are arranged so that light emitted from a light source would be diffused in the width direction (X-axis direction depicted in FIG. 3A) of the light guide plate 22 so as to cause brightness to be uniform. However, as depicted in the cross-sectional view in FIG. 3B, the light incident from LED 21 into the light guide plate 22 is reflected in the vertical direction (thickness direction, or the Z-axis direction depicted in FIG. 3B) at boundary portions (pointed portions) between the cylindrical lenses 25 and is outputted from the light-outgoing surface of the light guide plate 22 to the outside. This is how the uneven brightness is caused.

To avoid such problem, as depicted in FIG. 4, Japanese Laid-open Patent Publication No. 2004-6326 proposes that the surfaces of the cylindrical lenses 25, formed on a reflection surface side of a light guide plate 22, in a portion close to light sources (hatched portion in FIG. 4), are roughened, and that the resultant rough surfaces of the cylindrical lenses 25 are used to diffusely reflect light. In addition, Japanese Laid-open Patent Publication No. 2005-71610 discloses a light guide plate 31 in which cylindrical lenses 32 (protruded portions extending in the vertical direction to a light-entering surface) are provided on a light-outgoing surface side thereof as depicted in the cross-sectional view in FIG. 5. In this light guide plate 31, each boundary portion between the cylindrical lenses 32 is formed by a curved surface.

However, the present inventors consider that the methods disclosed in Japanese Laid-open Patent Publications Nos.

2004-6326 and 2005-71610 have the following problems. That is, the method disclosed in Japanese Laid-open Patent Publication No. 2004-6326, requires blasting as the surface roughening process, for example. The blasting is a process of forming unevenness by blasting sand (abrasive grains) onto a mold used in forming a light guide plate. In this case, it is required that a step of performing blasting on a mold, a step of manufacturing a light guide plate by using the blasted mold, and a step of evaluating optical characteristics of the manufactured light guide plate be repeated to manufacture a mold that can produce a light guide plate with a desired characteristic. However, the blasting is poor in reproduction of the uneven pattern. Thus, a longer time is required until a mold with a desired quality is obtained, which results in increasing the manufacturing cost.

In the light guide plate disclosed in Japanese Laid-open Patent Publication No. 2005-71610, the cylindrical lenses are provided on the light-outgoing side. Accordingly, there is a problem of deteriorating the brightness distribution characteristic because the light incident from the light source into the light guide plate is outputted to the liquid crystal panel side without being sufficiently diffused by the light guide plate.

SUMMARY

According to an aspect of an embodiment, a lighting device includes a light source and a light guide plate which receives light emitted from the light source through an end surface thereof and outputs the light from one surface in the thickness direction thereof. In the lighting device, a plurality of cylindrical lenses, each extending in a direction intersecting the end surface, are formed in parallel to each other on the other surface in the thickness direction of the light guide plate and the adjacent cylindrical lenses are connected by a concaved curved surface.

DESCRIPTION OF EMBODIMENTS

Preferred embodiments will be described by referring to the accompanying drawings.

First Embodiment

Figure 6:
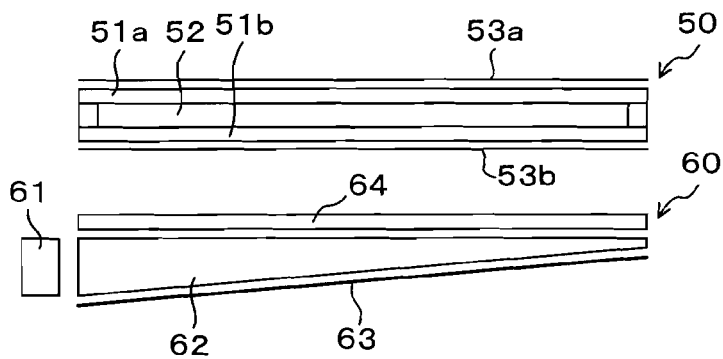
FIG. 6 is a schematic view depicting a lighting device according to a first embodiment and a liquid crystal display device using the lighting device.

FIG. 6 is a schematic view depicting a lighting device according to a first embodiment and a liquid crystal display device using the lighting device. As depicted in FIG. 6, the liquid crystal display device according to the first embodiment includes a liquid crystal panel 50 and a backlight (lighting device) 60 provided on the back surface side of the liquid crystal panel 50.

The liquid crystal panel 50 is formed by enclosing a liquid crystal 52 between two transparent substrates 51a and 51b. In addition, a polarizer 53a is provided on the front surface side (upper side in FIG. 6) of the liquid crystal panel 50 and a polarizer 53b is provided on the back surface side (lower side in FIG. 6). A size of the liquid crystal panel 50 is, for example, 2 to 4 inches.

The backlight 60 includes multiple LEDs 61 serving as a light source, a light guide plate 62, a reflection sheet (mirror or white sheet) 63, and a prism sheet 64. The LEDs 61 are arranged along an end surface (light-entering surface) on one side of the light guide plate 62.

The light guide plate 62 is formed of a transparent resin, such as polymethyl methacrylate (PMMA) and is formed to have a wedge-shaped cross section as depicted in FIG. 6. The size of the light guide plate 62 and the size of the liquid crystal panel 50 are substantially the same, and the thickness of the light guide plate 62 in the end portion on the side on which the LEDs are arranged (that is, a height of the light-entering surface) is approximately 1 mm. The reflection sheet 63 is arranged on the back surface side of this light guide plate 62 and the prism sheet 64 is arranged on the front surface side (liquid crystal panel 50 side) as a light distribution control plate.

Figure 7:
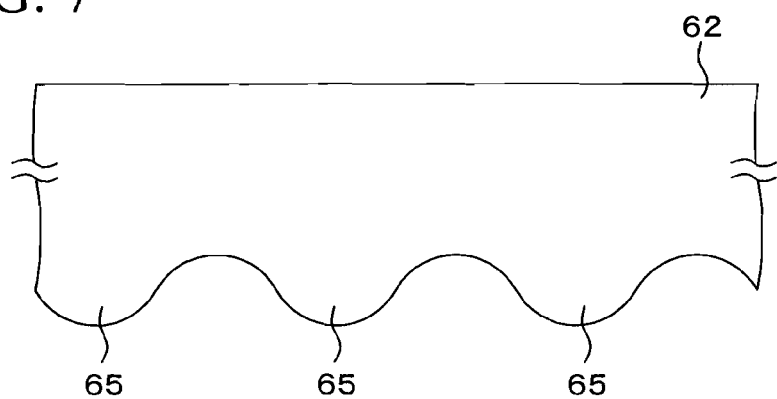
FIG. 7 is a cross-sectional view of the light guide plate used in the first embodiment.
Figure 8:
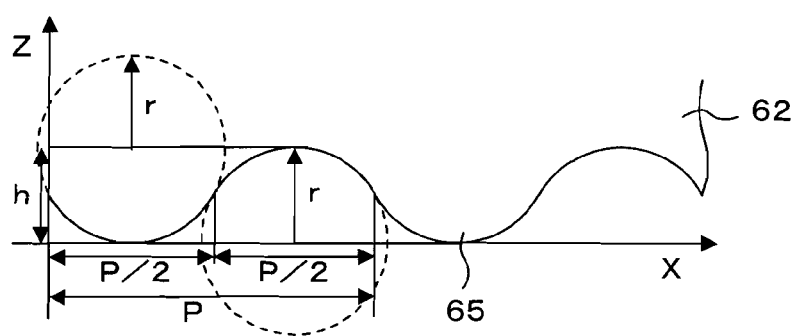
FIG. 8 is a schematic view depicting the shape of a curved surface of a cylindrical lens of the light guide plate used in the first embodiment and the shape of a concaved portion with the curved surface connecting the cylindrical lenses.

FIG. 7 is a cross-sectional view in a surface parallel to the light-entering surface of the light guide plate 62. FIG. 8 is a schematic view depicting the shape of the cylindrical lens provided to the light guide plate 62.

As depicted in FIG. 7, in the present embodiment, the multiple cylindrical lenses 65, each extending in the length direction (Y-axis direction, or the direction vertical to the light-entering surface) of the light guide plate 62, are arranged on the reflection surface side of the light guide plate 62 in the width direction (X-axis direction). As depicted in FIG. 8, the curved surfaces of these cylindrical lenses 65 are formed in a shape of a circle with the radius r. In addition, the cylindrical lenses 65 are connected by the concaved curved surface and the concaved curved surface is also formed in a shape of the circle with the radius r. That is, in the present embodiment, there is no pointed portion between the cylindrical lenses 65 adjacent to each other and the cylindrical lenses 65 are connected by a gently-curved surface with a curvature radius r. Note that, a height h of the cylindrical lens 65 is set to be smaller than the double of the radius r of the circle and an arrangement pitch p of the cylindrical lenses 65 is set to be smaller than the quadruple of the radius r of the circle.

Figure 9:
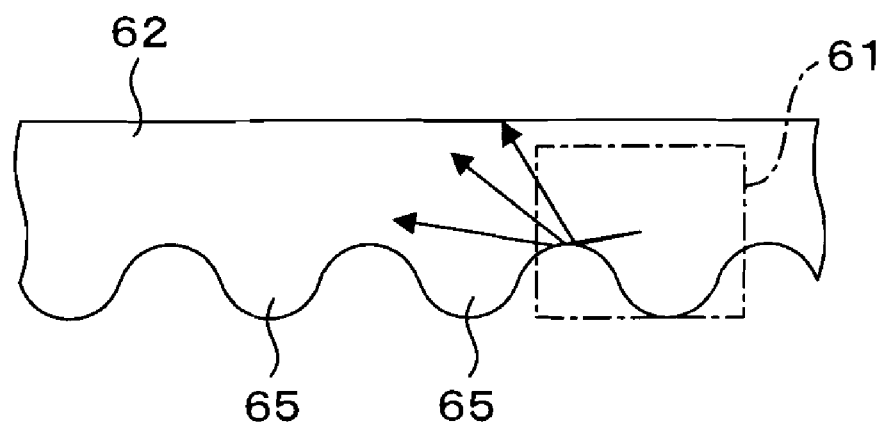
FIG. 9 is a schematic view depicting light reflection in a boundary portion between the cylindrical lenses of the light guide plate according to the first embodiment.

FIG. 9 is a schematic view depicting light reflection in a boundary portion between the cylindrical lenses of the light guide plate according to the present embodiment. Effects of the present embodiment will be described by referring to FIG. 9 and FIG. 3B depicting the conventional example.

Figure 1:
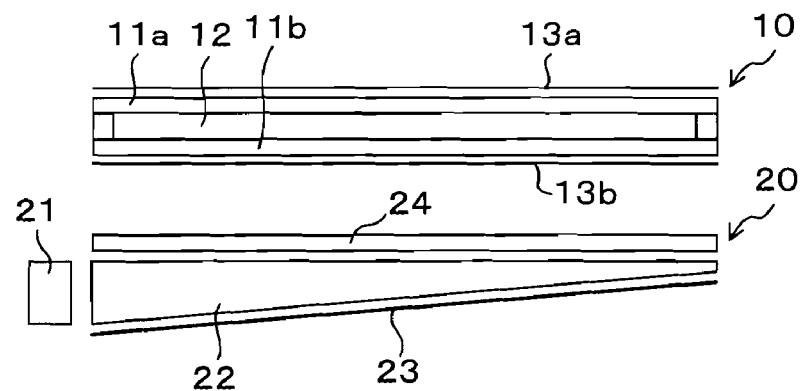
FIG. 1 is a schematic view depicting one example of a conventional liquid crystal display device (transmission-type liquid crystal display device)
Figure 2:
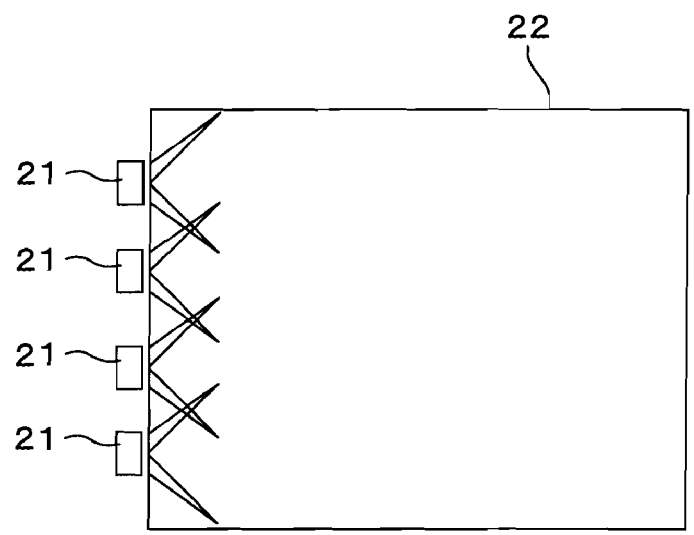
FIG. 2 is a schematic view depicting a problem of a conventional lighting device for a liquid crystal display device.
Figure 3A:
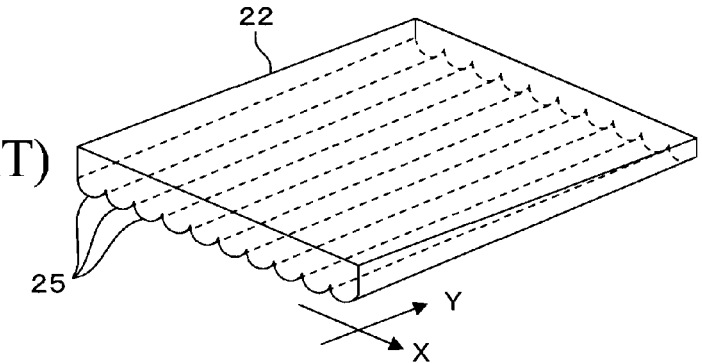
FIG. 3A is a perspective view depicting a conventional light guide plate.
Figure 3B:
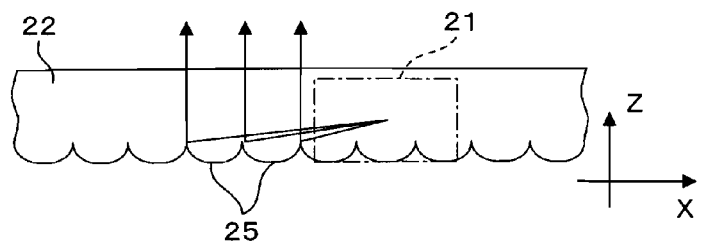
FIG. 3B is a cross-sectional view illustrating the reason of uneven brightness caused by the light guide plate.
Figure 4:
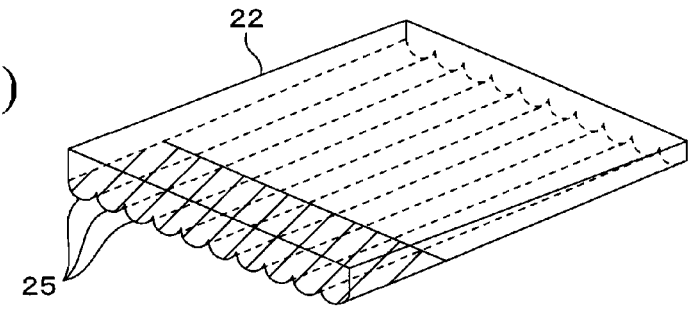
FIG. 4 is a perspective view depicting a light guide plate disclosed in Japanese Laid-open Patent Publication No. 2004-6326.
Figure 5:
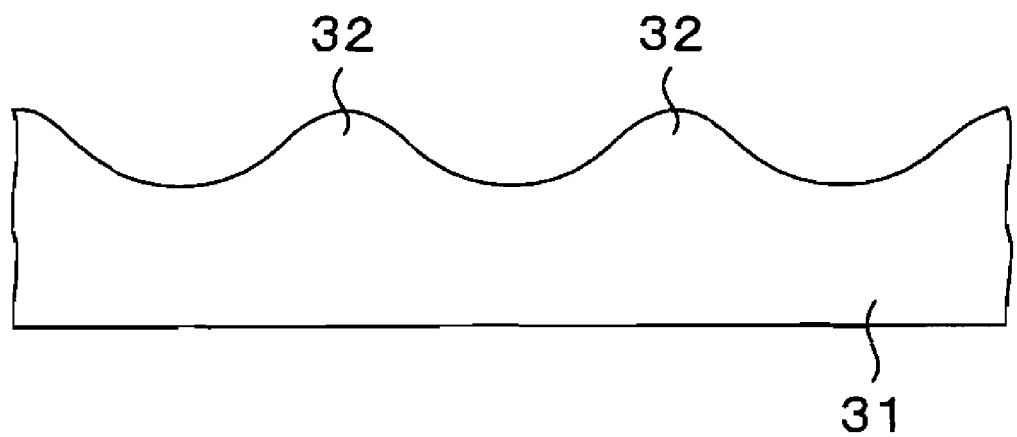
FIG. 5 is a cross-sectional view depicting a light guide plate disclosed in Japanese Laid-open Patent Publication No. 2005-71610.

In the conventional lighting device, as depicted in FIG. 3B, the pointed portion is present in the boundary portion between the adjacent cylindrical lenses 25. Accordingly, the light incident from the LEDs 21 into the light guide plate 22 is reflected in the boundary portion (pointed portion) between the adjacent cylindrical lenses 25 in the vertical direction to the light-outgoing surface, which results in uneven brightness. In contrast, in the present embodiment, as depicted in FIG. 9, the cylindrical lenses 65 are connected by the concaved portion with the gently-curved surface. Accordingly, the light emitted from the LEDs 61 and entering the light guide plate 62 is deflected in various directions in the boundary portion between the adjacent cylindrical lenses 65. For this reason, a percentage of the light to be emitted to the outside of the light guide plate 62 by being reflected in the vertical direction (thickness direction) in the boundary portions between the cylindrical lenses 65 is decreased. Thus, uneven brightness in the streaky form as depicted in FIG. 2 is prevented from being caused. Consequently, a display quality of the liquid crystal display device is improved.

Second Embodiment

Figure 10:
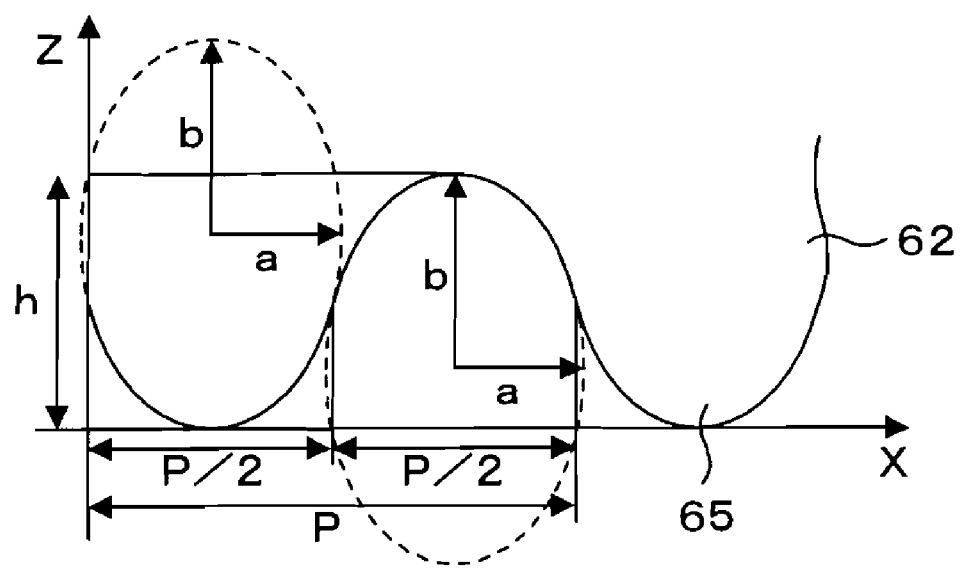
FIG. 10 is a view depicting the shape of the cylindrical lens which is provided on a light guide plate of a lighting device according to a second embodiment.

FIG. 10 is a view depicting the shape of a cylindrical lens provided to a light guide plate of a lighting device according to a second embodiment. The second embodiment is different from the first embodiment in the shape of the cylindrical lens provided on a reflection surface side of the light guide plate. The rest of the configuration is basically the same as that of the first embodiment, and the redundant description thereof will be omitted.

As depicted in FIG. 8, in the light guide plate 62 according to the first embodiment, both of each of the cylindrical lenses 65 and the boundary portion between the adjacent cylindrical lenses 65 have the shapes of the circle with the radius r. In contrast, in the light guide plate 62 according to the second embodiment, as depicted in FIG. 10, both of the cylindrical lenses 65 and the boundary portion between the adjacent cylindrical lenses 65 have shapes in a shape of an ellipse having a short axis in the X-axis direction (width direction of the light guide plate 62) and a long axis in the Z-axis direction (thickness direction of the light guide plate 62). Note that, a height h of the cylindrical lens 65 is set to be smaller than the double length of the semimajor axis b of the ellipse and an arrangement pitch p is set to be smaller than the quadruple length of the semiminor axis a of the ellipse.

Even in the second embodiment, each of the boundary portion between the adjacent cylindrical lenses 65 is formed by a concaved portion with a gently-curved surface. Thus, effects similar to those of the first embodiment can be obtained.

Figure 11A:
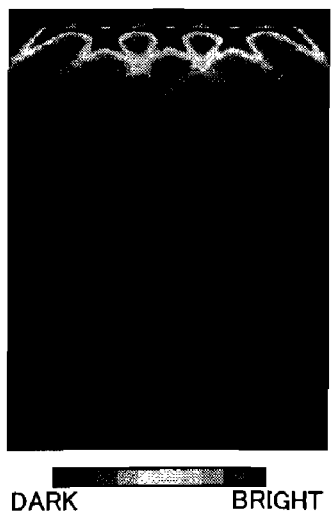
FIG. 11A is a view depicting a simulation result of brightness distribution of a conventional lighting device.
Figure 11B:
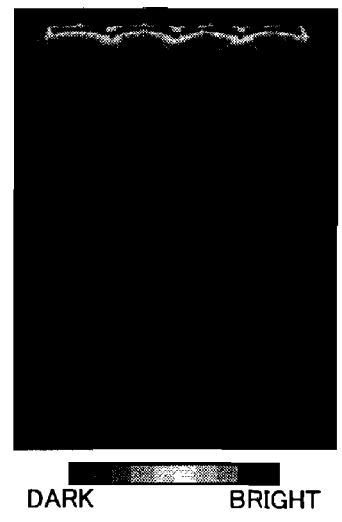
FIG. 11B is a view depicting a simulation result of brightness distribution of the lighting device according to the second embodiment.

FIG. 11A is a view depicting a simulation result of brightness distribution of a conventional lighting device having the cylindrical lenses with the shapes depicted in FIGS. 3A and 3B. FIG. 11B is a view depicting a simulation result of brightness distribution of a lighting device according to the present embodiment. Note that, the semiminor axis a of the ellipse is set to be 0.075 mm and the semimajor axis b is set to be 0.08 mm. In addition, the brightness distribution of light, which is reflected once by a reflection surface, is only simulated. By comparing these FIGS. 11A and 11B, it can be seen that the lighting device according to the present embodiment can suppress the streakly uneven brightness when compared with the conventional one.

Note that, in the second embodiment, each of the curved shapes of the cylindrical lenses 65 and the boundary portion between the adjacent cylindrical lenses 65 are determined by the ellipse having the long axis in the Z-axis direction (thickness direction of the light guide plate) and the short axis in the X-axis direction (width direction of the light guide plate). However, each of the curved shapes of the cylindrical lenses 65 and the boundary portion between the adjacent cylindrical lenses 65 may be determined by the ellipse having the long axis in the X-axis direction (width direction of the light guide plate) and the short axis in the Z-axis direction (thickness direction of the light guide plate).

Third Embodiment

Figure 12:
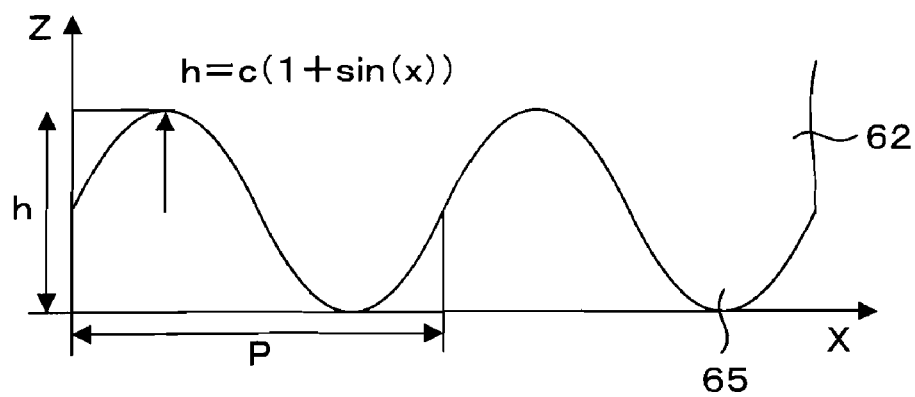
FIG. 12 is a view depicting the shape of a cylindrical lens provided on a light guide plate of a lighting device according to a third embodiment.

FIG. 12 is a view depicting the shape of a cylindrical lens provided to a light guide plate of a lighting device according to a third embodiment. The third embodiment is different from the first embodiment in the shape of a cylindrical lens provided on a reflection surface side of the light guide plate. The rest of the configuration is basically the same as that of the first embodiment, and the redundant description thereof will be omitted.

In the light guide plate according to the present embodiment, as depicted in FIG. 12, cylindrical lenses 65 and the boundary portion between the adjacent cylindrical lenses 65 are both formed along the sine curve of $h=c(1+\sin(x))$. Even in the third embodiment, the boundary portion between the adjacent cylindrical lenses 65 is formed by a concaved portion with a gently-curved surface. Thus, effects similar to those of the first embodiment can be obtained.

Fourth Embodiment

Figure 13:
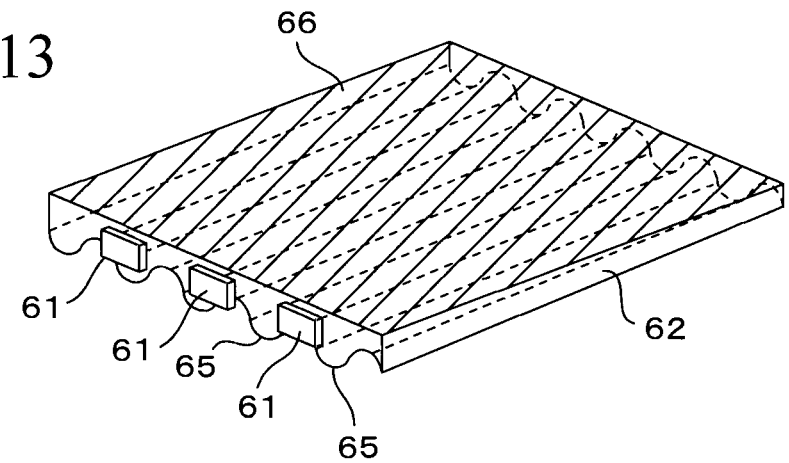
FIG. 13 is a perspective view depicting a lighting device according to a fourth embodiment.

FIG. 13 is a perspective view depicting a lighting device according to a fourth embodiment. The fourth embodiment is different from the first embodiment in that a light diffusion element is provided on a light-outgoing surface of a light guide plate. The rest of the configuration is basically the same as that of the first embodiment, and the redundant description thereof will be omitted.

Figure 14A:
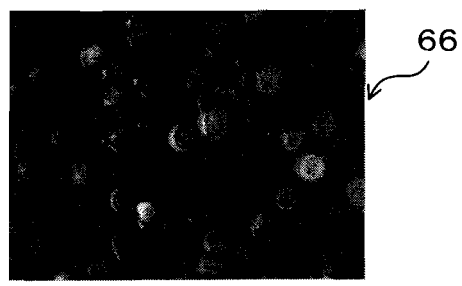
FIG. 14A is an enlarged view depicting a light diffusion element (unevenness) formed on a light-outgoing surface of the light guide plate.
Figure 14B:
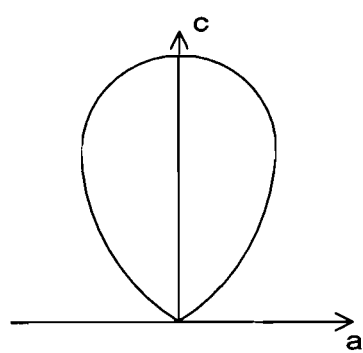
FIG. 14B is a view depicting a diffusion profile of light on a surface perpendicular to the surface on which the light diffusion element is formed.
Figure 14C:
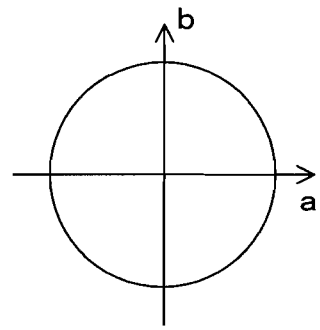
FIG. 14C is a view depicting a diffusion profile of light on a plane (ab plane) parallel to the surface on which the light diffusion element is formed.

In the present embodiment, fine unevenness as a light diffusion element 66 is formed on the entire light-outgoing surface (hatched surface in FIG. 13) of a light guide plate 62. The fine unevenness is formed by, for example, blasting a mold to be used to manufacture the light guide plate. FIG. 14A is an enlarged view depicting the light diffusion element 66 (unevenness) formed on the light-outgoing surface of the light guide plate. FIG. 14B is a view depicting a diffusion profile of light diffused by the light diffusion element (unevenness) by using the direction a parallel to the surface on which the light diffusion element is formed as the lateral axis and the direction c vertical to the surface on which the light diffusion element is formed as the longitudinal axis. Furthermore, FIG. 14C is a view depicting a diffusion profile of light diffused by the light diffusion element on a plane (ab plane) parallel to the surface on which the light diffusion element is formed. In the present embodiment, the diffusion profile of light on the plane parallel to the surface on which the light diffusion element is formed is set to be a rotationally-symmetric shape (circular shape) as depicted in FIG. 14C.

In the present embodiment, effects similar to those of the first embodiment can be obtained. In addition, in the present embodiment, the light diffusion element 66 is formed on the light-outgoing surface of the light guide plate 62. Thereby, distribution of light emitted from a backlight can be made more uniform. In addition, the light distribution can be controlled by partially changing the density or depth of the unevenness configuring the light diffusion element 66. For example, light intensity irradiating the center portion of the panel can be set to be higher than light intensity irradiating the periphery of the panel, or vice versa.

Figure 15A:
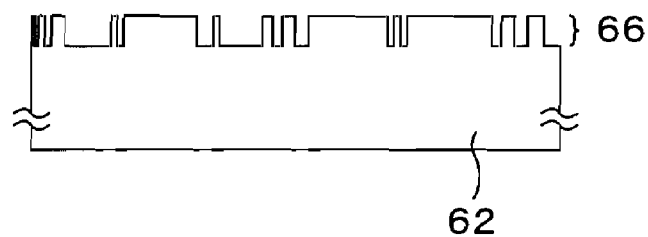
FIG. 15A is a cross-sectional view depicting a light diffusion element (diffractive-optical element (DOE)) provided on a light-outgoing surface of the light guide plate.
Figure 15B:
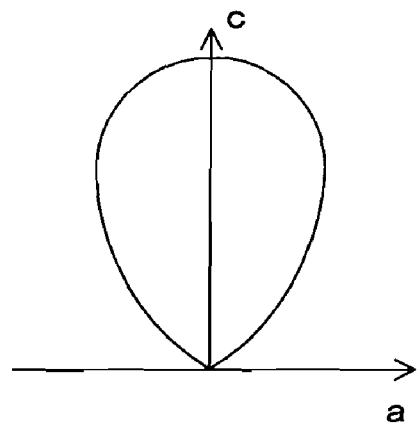
FIG. 15B is a view depicting a diffusion profile of light on a surface perpendicular to the surface on which the light diffusion element is formed.
Figure 15C:
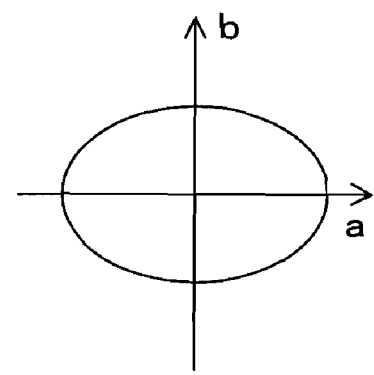
FIG. 15C is a view depicting a diffusion profile of light on a plane parallel to the surface on which the light diffusion element is formed.

As the light diffusion element 66, a diffractive optical element (DOE) may be used. For example, as depicted in FIG. 15A, the DOE is formed of a binary uneven pattern, that is, an uneven pattern in which a depth and a height are both uniform. The uneven pattern of the DOE is determined by optimizing the uneven pattern by a Gerchberg-Saxton method or a simulated annealing method based on a desired characteristic. FIG. 15B is a view depicting diffusion profile of light diffused by the light diffusion element (DOE) by using the direction a parallel to the surface on which the light diffusion element is formed as the lateral axis and the direction c vertical to the plane on which the light diffusion element is formed as the longitudinal axis. FIG. 15C is a view depicting a diffusion profile of light diffused by the light diffusion element 66 on a plane (ab plane) parallel to the surface on which the light diffusion element is formed. If a DOE is used as the light diffusion element 66, it is easy to obtain an ellipsoidal diffusion profile on the plane parallel to the surface on which the light diffusion element is formed, for example, as depicted in FIG. 15C.

FIGS. 16A to 16E are schematic views depicting an example of a manufacturing method of a forming mold to be used in forming the DOE.

Firstly, a reticle (exposure mask) on which an uneven pattern determined by the Gerchberg-Saxton method or the simulated annealing method is depicted is prepared.

Figure 16A:
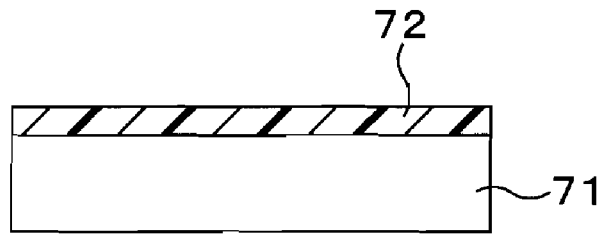
FIGS. 16A to 16E are schematic views depicting processes of manufacturing a forming mold to be used in forming the DOE.
Figure 16B:
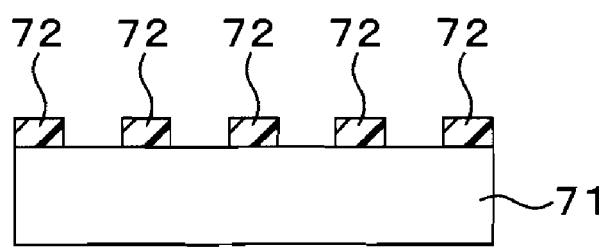

Subsequently, as depicted in FIG. 16A, a photoresist is applied onto a silicon substrate 71 to form a photoresist film 72. Then, stepper exposure (reduction exposure) is performed by the prepared reticle. After that, a developing process is performed to transfer the uneven pattern on the reticle on the photoresist film 72 as depicted in FIG. 16B.

Figure 16C:
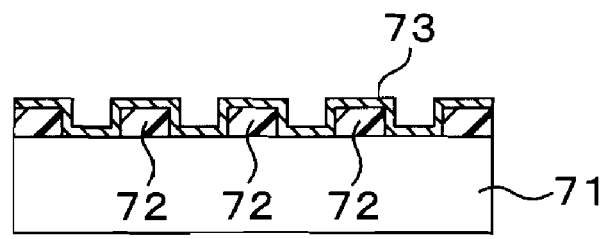
Figure 16D:
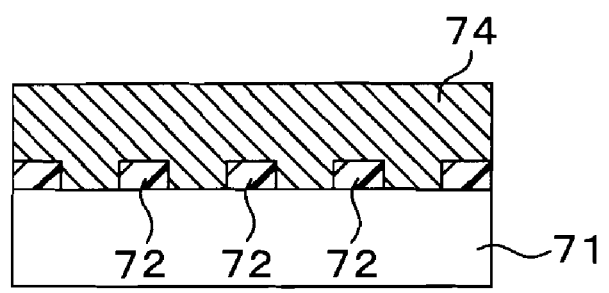

Thereafter, as depicted in FIG. 16C, the entire upper surface of the silicon substrate 71 is sputtered with Ni (nickel) to form a base film 73. Then, as depicted in FIG. 16D, Ni is electrolytically plated on the base film 73 until it has a sufficient thickness, and a metal block 74 is formed.

Figure 16E:
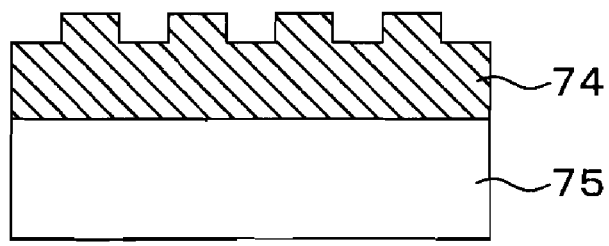

Thereafter, as depicted in FIG. 16E, the metal block 74 is taken out from the silicon substrate 71 and the outer shape thereof is processed in a predetermined shape. Then, the meal block is bonded with a reinforcing plate 75 to form a forming mold. However, when the metal block 74 has sufficient strength, the metal block 74 may be set as a forming mold without bonding the reinforcing plate 75.

The forming mold, in which the uneven pattern is formed in above described manner, is combined with another forming mold. Thereafter, the light guide plate 62 having DOE on the light-outgoing surface is formed by injecting a transparent resin, such as PMMA, into a space formed by the forming mold Fifth Embodiment A fifth embodiment will be described below. The fifth embodiment is different from the first embodiment in that a light distribution conversion element is provided on a light-entering surface of a light guide plate, and the rest of the configuration are basically the same as that of the first embodiment.

Figure 17:
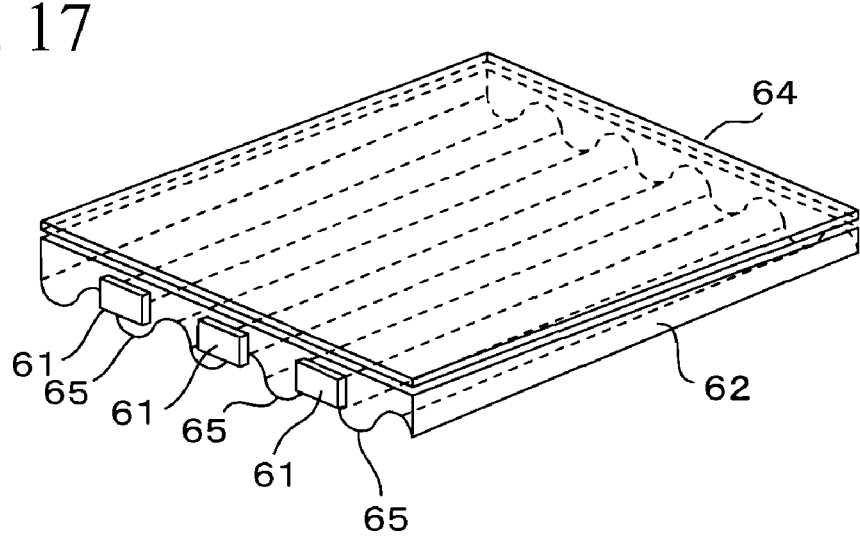
FIG. 17 is a perspective view depicting an example in which a prism sheet is arranged on a light guide plate in a fifth embodiment.

FIG. 17 is a perspective view depicting an example in which a prism sheet 64 is arranged on a light guide plate 62. Light emitted from an LED 61 enters the light guide plate 62 from the light-entering surface of the light guide plate 62 and repeatedly reflected between a reflection surface and a light-outgoing surface. Then, the light not satisfying the total internal reflection condition is outputted from the light-outgoing surface. The prism sheet 64 refracts the light emitted from the light guide plate 62 in a direction substantially perpendicular to the light-outgoing surface of the light guide plate 62. Note that, two prism sheets may be arranged on the light guide plate 62 so as to be perpendicular to each other.

Figure 18:
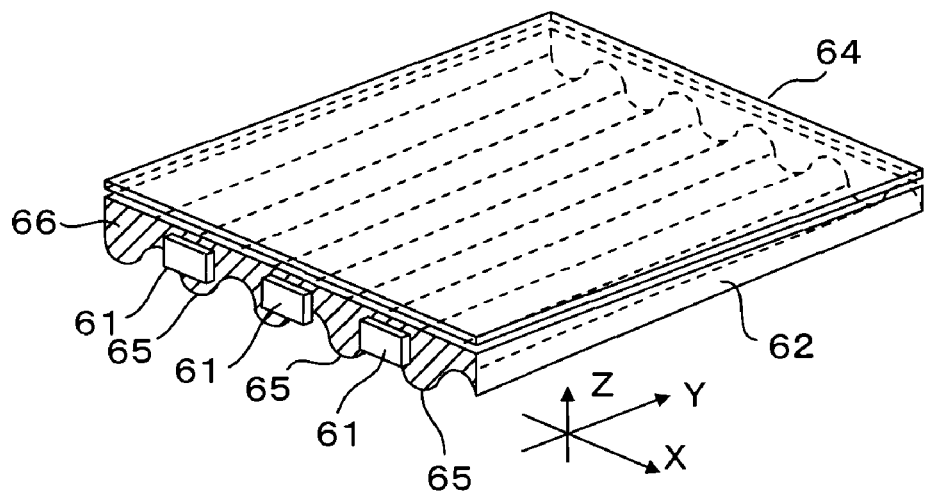
FIG. 18 is a perspective view depicting an example in which a light distribution conversion element is provided on an end surface of the light guide plate.
Figure 19A:
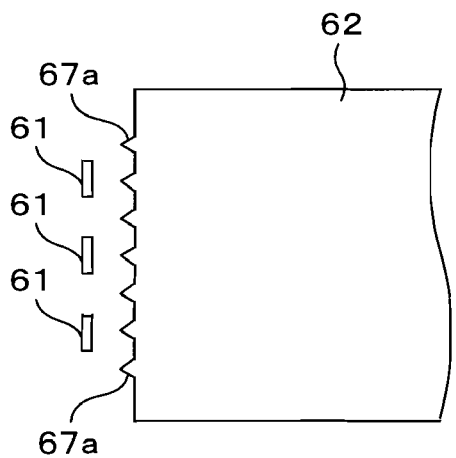
FIGS. 19A and 19B are perspective views, each depicting an example in which a prism is used as the light distribution conversion element.
Figure 19B:
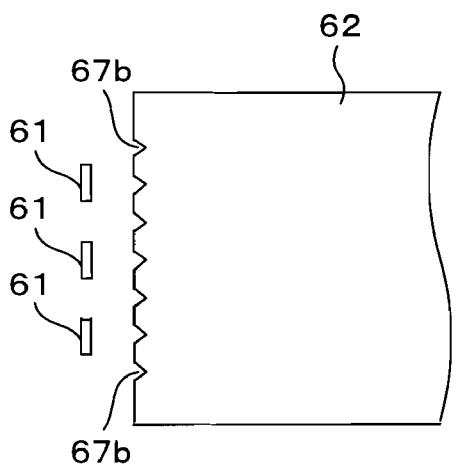

In the mean time, if the end surface (light-entering surface) of the light guide plate 62 is planar, regions near the end surface between the LEDs 61 becomes dark, which causes uneven brightness. To avoid such inconvenience, in the present embodiment, as depicted in FIG. 18, a light distribution conversion element 67 diffusing the light emitted from the LEDs 61 in the width direction (X-axis direction) of the light guide plate 62 is provided on the end surface of the light guide plate 62. As the light distribution conversion element 67, for example, a DOE or fine unevenness formed by blasting may be used. In addition, as the light distribution conversion element 67, as depicted in FIGS. 19A and 19B, prisms 67a and 67b may be provided on the end surface of the light guide plate 62. The prisms 67a depicted in FIG. 19A are provided on the end surface of the light guide plate 62 and are triangular protrusions. The prisms 67b depicted in FIG. 19B are provided on the end surface of the light guide plate 62 and are triangular notches. As described above, by providing the light distribution conversion element 67 on the end surface of the light guide plate 62, the uneven brightness caused near the end surface of the light guide plate 62 can be suppressed.

Figure 20:
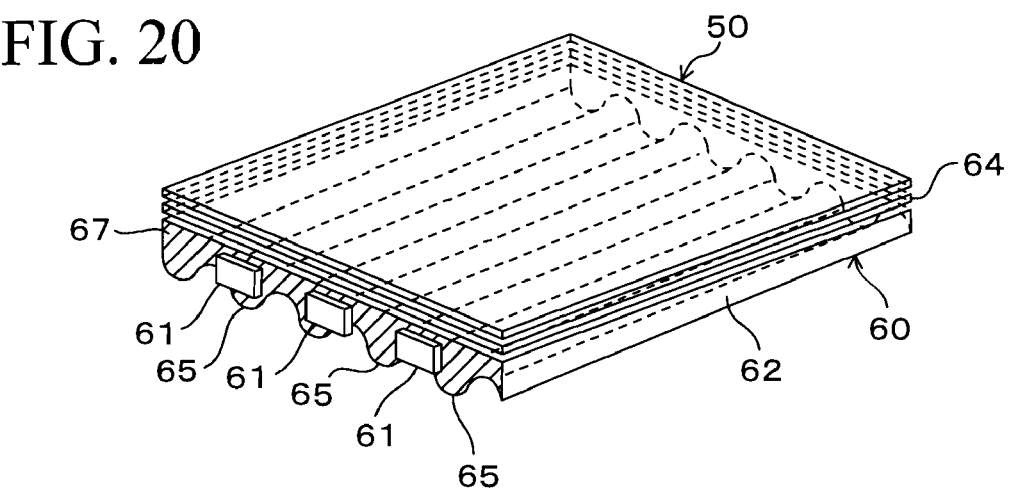
FIG. 20 is a perspective view depicting a liquid crystal display device in which a liquid crystal panel is arranged on a backlight (lighting device)

FIG. 20 is a perspective view depicting a liquid crystal display device in which a liquid crystal panel 50 is provided on a backlight (lighting device) with the above-described configuration. As described above, the liquid crystal panel 50 has the configuration in which a liquid crystal is enclosed between two transparent substrates (glass substrates). A polarizer is arranged on each side in the width direction of the liquid crystal panel 50 (see, FIG. 6). A voltage is applied between a pixel electrode and a common electrode to control an amount of light transmitting through the liquid crystal panel 50 for each pixel, so that a character or image can be displayed.

As the light guide plate 62 of the backlight 60, a cylindrical lens 65 with the shape described in any of the first to third embodiments is used. It is preferable that a light diffusion element as described in the fourth embodiment be formed on the light-outgoing surface of the light guide plate 62. In the present embodiment, as depicted in FIG. 18, the light distribution conversion element (fine unevenness, DOE, prism, or the like) 67 is formed on the end surface of the light guide plate 62. The liquid crystal display device configured as such uniformly irradiates the entire surface of the liquid crystal panel 50 with the light emitted from the backlight 60. Thus, uneven brightness is prevented and a display quality of an image is improved.

Sixth Embodiment

A sixth embodiment will be described below. The sixth embodiment is different from the first embodiment in a cross-sectional shape of a cylindrical lens provided on a reflection surface of a light guide plate. The rest of the configuration is basically the same as that of the first embodiment, and the redundant description thereof will be omitted.

Figure 21:
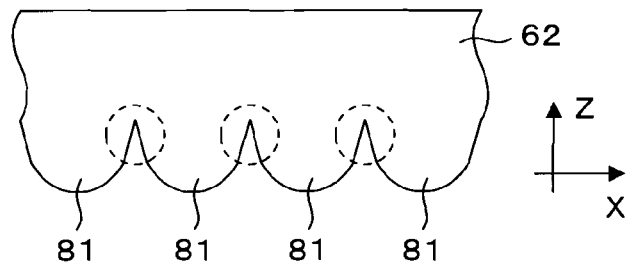
FIG. 21 is a cross-sectional view depicting the shape of a cylindrical lens provided on a light guide plate in a lighting device according to a sixth embodiment.
Figure 22:
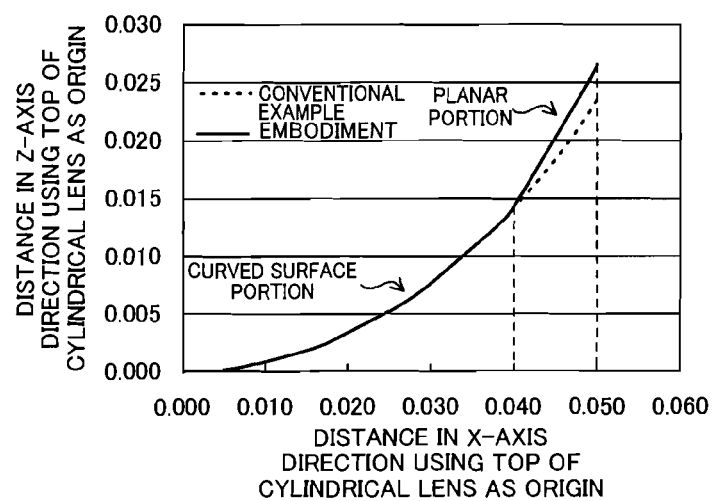
FIG. 22 is a graph depicting in further detail a cross-sectional shape of the cylindrical lens.

FIG. 21 is a cross-sectional view depicting the shape of a cylindrical lens 81 provided on a light guide plate 62 of a lighting device according to the sixth embodiment. FIG. 22 is a graph depicting further in detail the cross-sectional shape of the cylindrical lens by taking, as the lateral axis, a distance in the X-axis direction (width direction) using the top of the cylindrical lens 81 as an origin and taking, as the longitudinal axis, a distance in the Z-axis direction (thickness direction) using the top of the cylindrical lens 81 as an origin. Note that, the solid line in the graph denotes the shape of the cylindrical lens (embodiment) used in the present embodiment and the dotted line denotes the shape of the conventional cylindrical lens.

In the light guide plate 62 of the present embodiment, as depicted in FIG. 21, joints (portions surrounded by the dotted circles in FIG. 21) where the cylindrical lenses 81 are connected are formed with planar surfaces. In the following, the joints between the cylindrical lenses 81 are referred to as planar portions in the present embodiment. Note that, similarly to the first to third embodiments, the head (curved surface portion) of the cylindrical lens 81 is formed in a shape of a curve of a circle, an ellipse, or a sine curve. Here, the curved surface portion of the cylindrical lens 81 is set to be formed in a shape of the ellipse with the semimajor axis a of 0.08 mm and the semiminor axis b of 0.075 mm (see, FIG. 10).

In the present embodiment, as depicted in FIG. 22, the length from the top of the cylindrical lens 81 to a boundary portion with the adjacent cylindrical lens 81 in the X-axis direction is 0.05 mm. The length of the curved surface portion of the cylindrical lens 81 in the X-axis direction is 0.04 mm. The length of the planar portion of the cylindrical lens 81 in the X-axis direction is 0.01 mm. In addition an angle θ of the planar portion of the cylindrical lens 81 in relation to the X-axis (that is, angle to the arrangement direction of the cylindrical lenses 81) is 50°.

Figure 23:
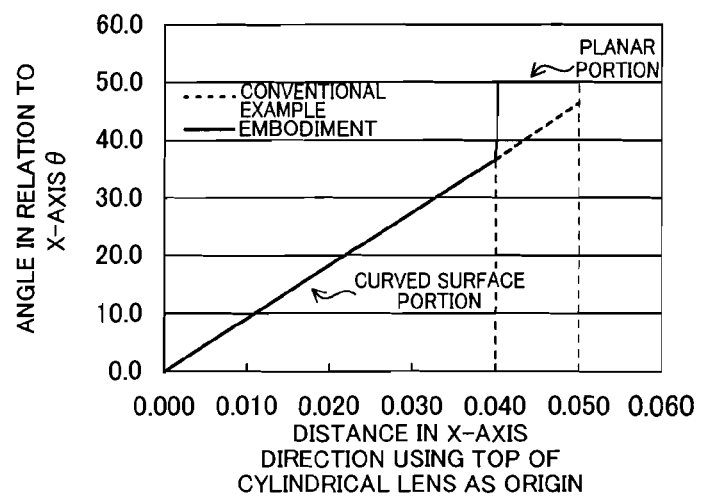
FIG. 23 is a graph depicting an angle of a tangent in each position from the top of the cylindrical lens to a boundary portion.

FIG. 23 is a graph depicting an angle of a tangent in each position from the top of the cylindrical lens 81 to the boundary portion by taking, as the lateral axis, a distance from the top of the cylindrical lens 81 in the X-axis direction and taking an angle θ (θ=tan$^{-1}$ (ΔZ/ΔX)) as the longitudinal axis. Note that, the solid line in FIG. 23 denotes an inclination of the tangent in each position of the cylindrical lens used in the present embodiment and the dotted line denotes an inclination of the tangent in each position of the conventional cylindrical lens.

In the present embodiment, the curved surface of the cylindrical lens 81 is formed in a shape of the ellipse. Accordingly, as depicted in FIG. 23, the angle θ of the tangent linearly changes in a range of 0.04 mm on either side from the top (origin) of the cylindrical lens 81. In addition, since the cylindrical lens 81 is planar in a range from 0.04 mm to the boundary portion (0.05 mm), the inclination θ of the tangent becomes a constant value (θ=50).

Figure 24:
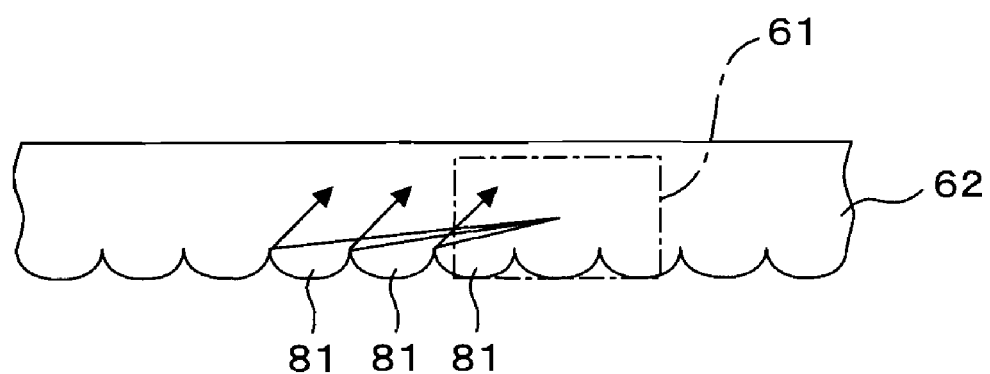
FIG. 24 is a schematic view depicting an effect of the sixth embodiment.

FIG. 24 is a view depicting effects of the present embodiment. As depicted in FIG. 24, in the present embodiment, the light which is emitted from the LED 61 and enters the light guide plate 62 is reflected in a diagonal direction by the planar portion near the boundary portion between the cylindrical lenses 81. Thereby, a percentage of the light to be emitted to the outside of the light guide plate 62 by being reflected in the vertical direction (thickness direction) in the boundary portion between the cylindrical lenses 81 is decreased. Thus, the streaky uneven brightness as depicted in FIG. 2 is prevented from occurring.

Figure 25:
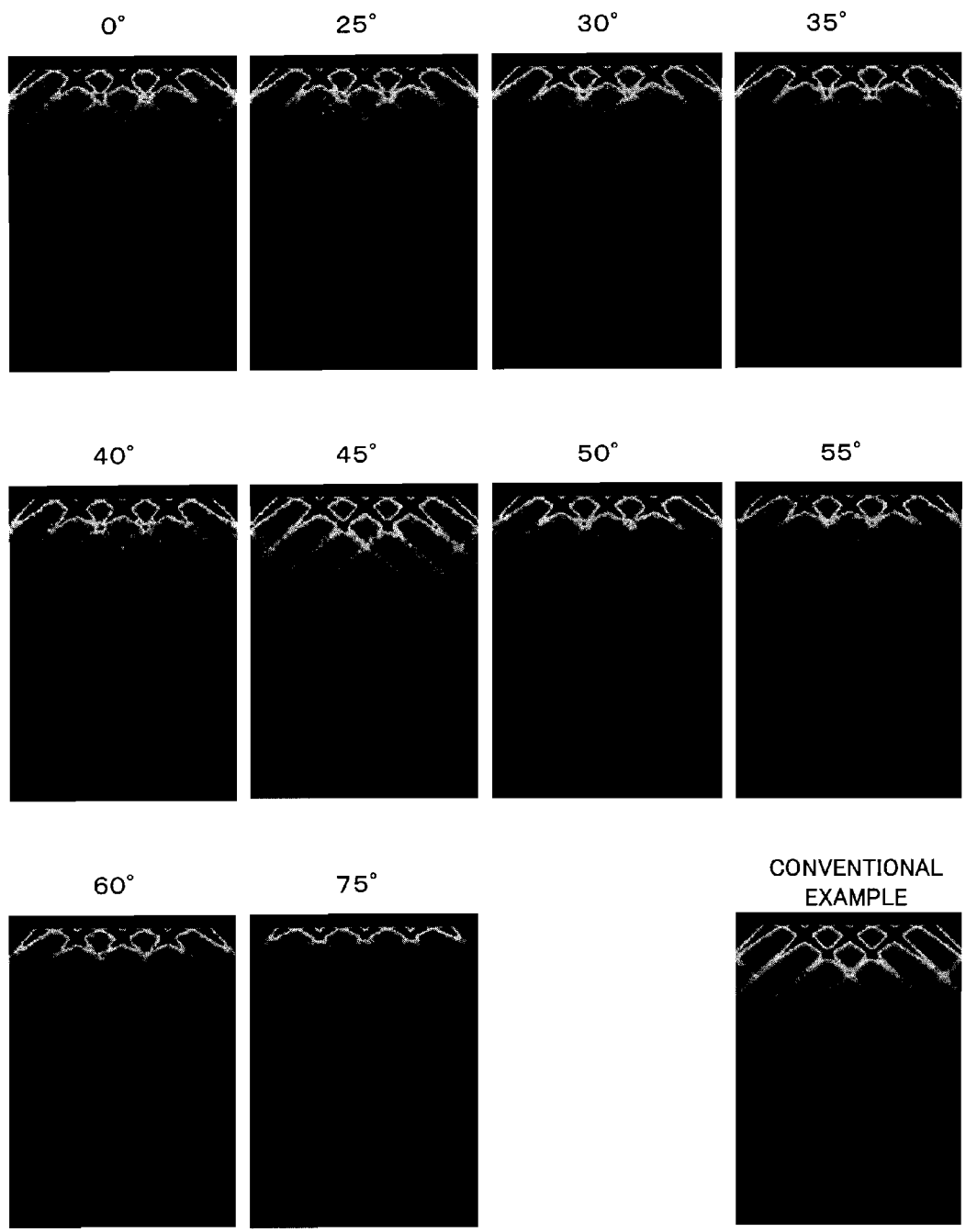
FIG. 25 is a view depicting simulation results of brightness distribution on a light-outgoing surface of the light guide plate, which are obtained by changing an angle in relation to the X-axis in a planar portion of the cylindrical lens in a range of 0 to 75°.
Figure 26:
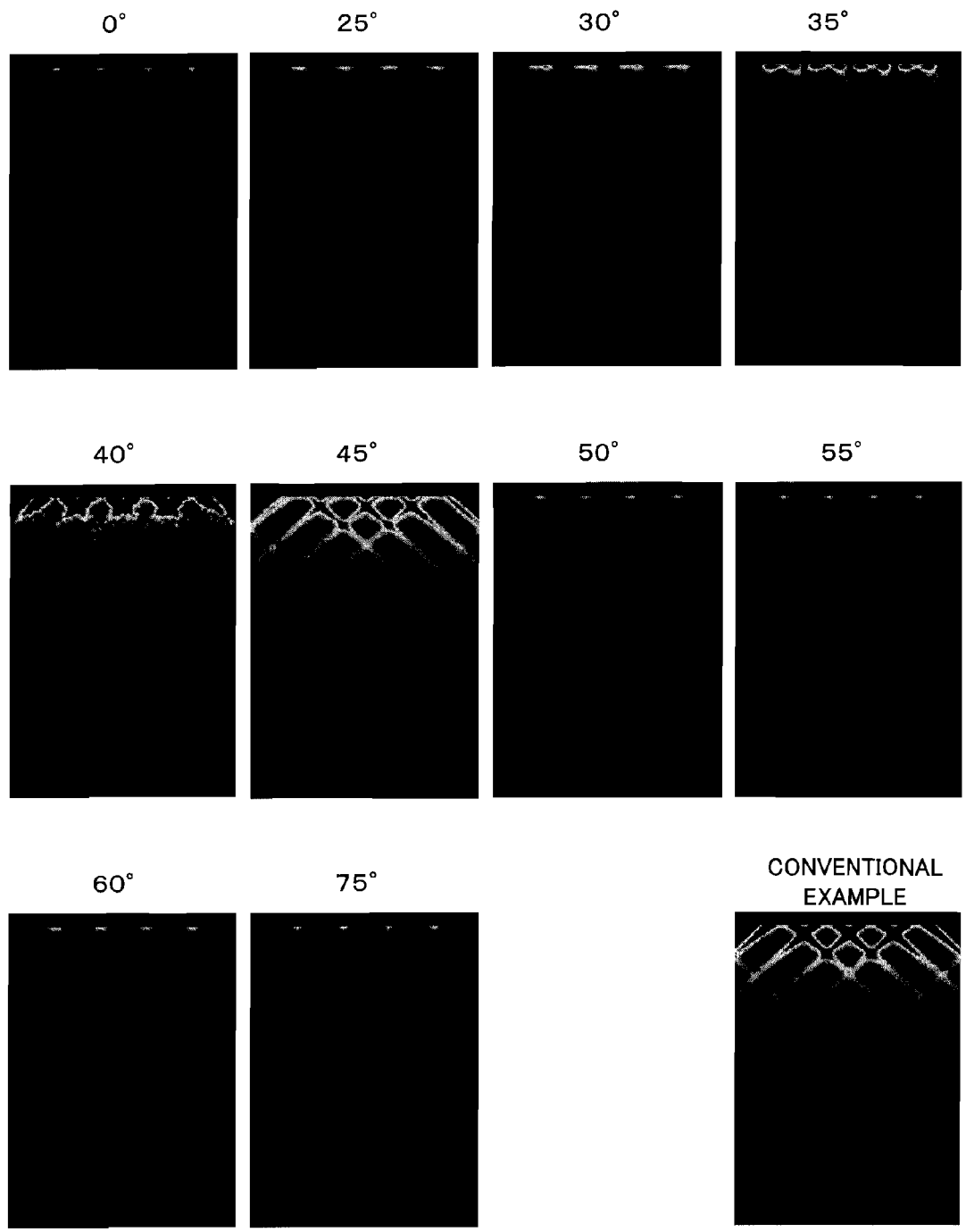
FIG. 26 is a view depicting another simulation results of brightness distribution on the light-outgoing surface of the light guide plane, which are obtained by changing an angle in relation to the X-axis in a planar portion of the cylindrical lens in a range of 0 to 75°.

FIG. 25 is a view depicting simulation results of brightness distribution on the light-outgoing surface of the light guide plate, which are obtained by using the length in the X-axis direction from the top of the cylindrical lens 81 to the boundary portion as 1, setting the length in the X-axis direction of the planar portion to be 0.05 (5%), and changing an angle of the planar portion in relation to the X-axis in a range of 0 to 75°. In addition, FIG. 26 is a view depicting simulation results of brightness distribution on the light-outgoing surface of the light guide plate by using the length in the X-axis direction from the top of the cylindrical lens 81 to the boundary portion as 1, setting the length in the X-axis direction of the planar portion to be 0.5 (50%), and changing an angle of the planar portion in relation to the X-axis direction in a range of 0 to 75°. However, the simulations are performed on the brightness distributions of only the light which is reflected once by the reflection surface. In addition, FIGS. 25 and 26 also depict the simulation results of the brightness distribution of the conventional light guide plate having the cylindrical lens with the shape depicted in FIG. 3B for reference.

As is clear from these FIGS. 25 and 26, in the present embodiment, brightness distribution can be made more uniform than the conventional one. However, if the angle of the planar portion of the cylindrical lens 81 in relation to the X-axis (the arrangement direction of the cylindrical lenses) is 45°, the effect of preventing the uneven brightness is small. For this reason, it is preferable that the angle of the planar portion of the cylindrical lens 81 in relation to the X-axis be other than 45°. For example, it is preferable that the angle of the planar portion of the cylindrical lens 81 in relation to the X-axis be in a range of 0 to 40° or 50 to 90°.

In addition, from the experiments conducted by the present inventors, it becomes clear that light cannot be sufficiently diffused and thus the brightness distribution characteristic is deteriorated when the length of the curved surface portion (length in the X-axis direction) of the cylindrical lens 81 is not greater than 50% of the entire length (in the X-axis direction from the top to the boundary) of the cylindrical lens 81. Accordingly, it is preferable that the length in the X-axis of the curved surface portion of the cylindrical lens 81 be 50% or more of the length in the X-axis from the top of the cylindrical lens 81 to the boundary portion. In other words, it is preferable that the length of each planar portion of the cylindrical lens 81 in the X-axis direction be less than 50% of the length in the X-axis direction from the top to the boundary portion.

Figure 27:
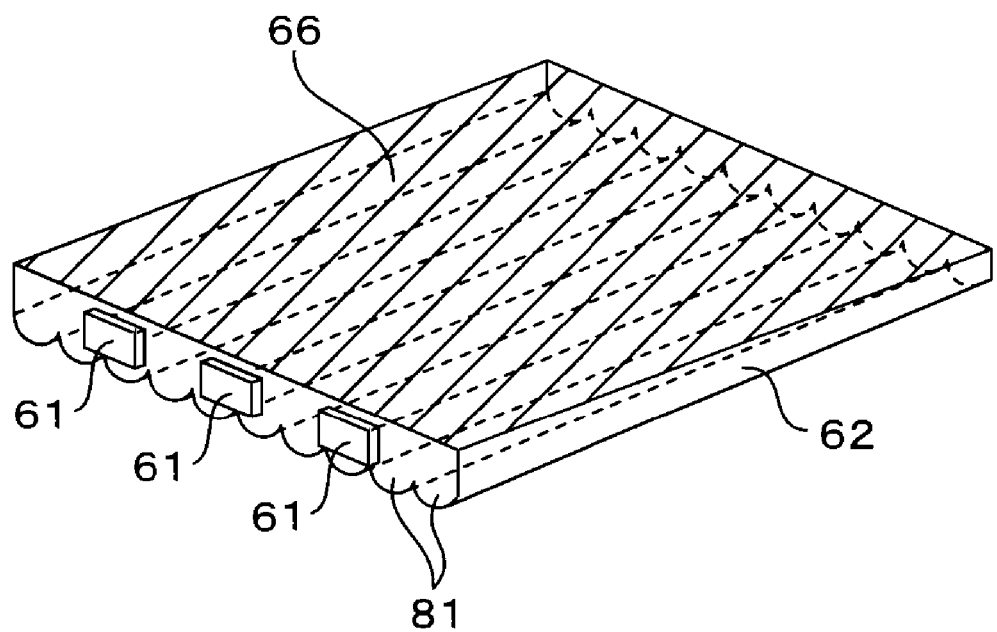
FIG. 27 is a perspective view depicting an example in which a light diffusion element is formed on the light-outgoing surface of the light guide plate having the cylindrical lens described in the sixth embodiment.

FIG. 27 is a perspective view depicting an example in which a light diffusion element 66 is formed on the light-outgoing surface of the light guide plate 62 having the cylindrical lenses 81 with the above-described shapes. As described in the fourth embodiment, as the light diffusion element 66, a DOE or fine unevenness formed by blasting may be used. Thereby, a desired brightness distribution characteristic can be obtained.

Figure 28:
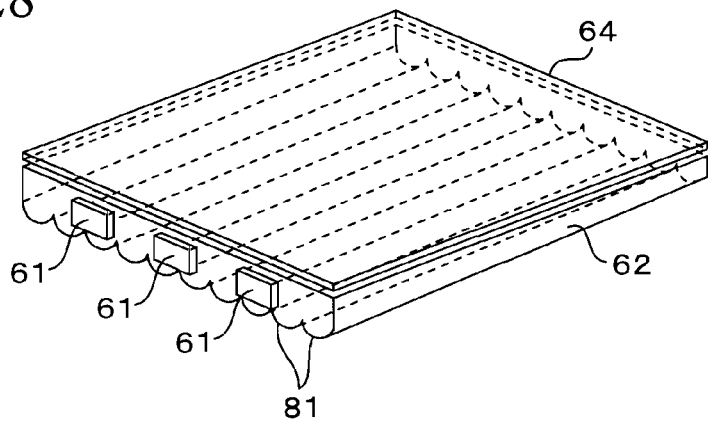
FIG. 28 is a perspective view depicting an example in which a prism sheet is provided on the light guide plate depicted in FIG. 27.

FIG. 28 is a perspective view depicting an example in which a prism sheet 64 is arranged on the light guide plate 62 depicted in FIG. 27. The light emitted from the LED 61 enters the light guide plate 62 from the light-entering surface of the light guide plate 62 and repeatedly reflected between the reflection surface and the light-outgoing surface. Then, the light not satisfying the total internal reflection condition is outputted from the light-outgoing surface. The prism sheet 64 refracts the light emitted from the light guide plate 62 in a direction substantially perpendicular to the light-outgoing surface of the light guide plate 62.

Figure 29:
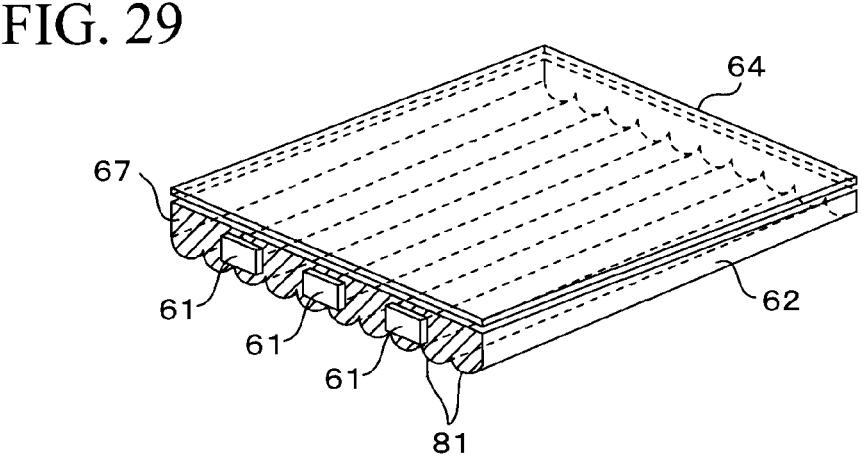
FIG. 29 is a perspective view depicting an example in which a light distribution conversion element is arranged on a light-entering surface of the light guide plate depicted in FIG. 28.

FIG. 29 is a perspective view depicting an example in which a light distribution conversion element 67 is arranged on the light-entering surface of the light guide plate 62 depicted in FIG. 28. As the light distribution conversion element 67, as described in the fifth embodiment, a DOE, fine unevenness formed by blasting, or a prism, may be used. Thereby, the light entering the light guide plate 62 can be more widely diffused. Consequently, uneven brightness caused near the light-entering surface can be prevented.

Figure 30:
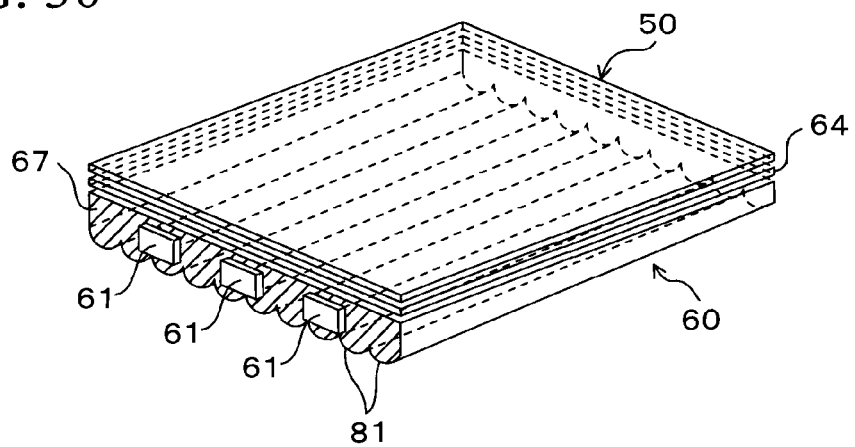
FIG. 30 is a perspective view depicting an example of a liquid crystal display device in which a liquid crystal panel is arranged on the backlight (lighting device) depicted in FIG. 29.

FIG. 30 is a perspective view depicting an example of a liquid crystal display device in which a liquid crystal panel 50 is arranged on a backlight (lighting device) 60 depicted in FIG. 29. The liquid crystal display device configured as depicted in FIG. 30 is excellent in brightness distribution characteristics of the backlight 60. Thus, uneven brightness is prevented from occurring and a display quality is further improved when compared with the conventional one.

Note that, in the above-described embodiments, the description is given by describing the example in which the lighting device of the present invention is arranged on the back surface side of the liquid crystal panel as the backlight. However, the present invention is also applicable to the front light which is arranged on the front surface side of the liquid crystal panel.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A lighting device, comprising:
a light source; and
a light guide plate which receives light emitted from the light source through an end surface thereof and outputs the light from one surface in a thickness direction thereof, wherein
a plurality of cylindrical lenses, each extending in a direction intersecting the end surface, are formed in parallel to each other on the other surface in the thickness direction of the light guide plate, and the adjacent cylindrical lenses are connected by a concaved curved surface.

2. The lighting device according to claim 1, wherein a curved surface of each of the cylindrical lenses is formed in a shape of any of a circle, ellipse, and sine curve.

3. The lighting device according to claim 1, wherein the concaved curved surface is formed in a shape of any of a circle, ellipse, and sin curve.

4. The lighting device according to claim 1, wherein the curved surface of the cylindrical lens and the concaved curved surface are formed in a shape of any of a same-sized circle, ellipse, and sine curve.

5. The lighting device according to claim 1, wherein the light source is formed of a light emitting diode (LED).

6. The lighting device according to claim 1, wherein a light diffusion element diffusing outgoing light is provided on the one surface of the light guide plate.

7. The lighting device according to claim 6, wherein the light diffusion element is formed of a diffractive-optical element (DOE) provided on the one surface.

8. The lighting device according to claim 1, wherein a light distribution conversion element is provided on the end surface of the light guide plate.

9. The lighting device according to claim 8, wherein the light distribution conversion element is formed of a diffractive-optical element (DOE) provided on the end surface.

10. The lighting device according to claim 1, wherein a prism sheet is arranged on the one surface of the light guide plate.

11. A liquid crystal display device, comprising:
a light source;
a light guide plate which receives light emitted from the light source through an end surface thereof and outputs the light from one surface in a thickness direction thereof; and
a liquid crystal panel arranged on the one surface, wherein a plurality of cylindrical lenses, each extending in a direction intersecting the end surface, are formed in parallel to each other on the other surface in the thickness direction of the light guide plate, and the adjacent cylindrical lenses are connected by a concaved curved surface.

12. A lighting device, comprising:
a light source; and
a light guide plate which receives light emitted from the light source through an end surface thereof and outputs the light form one surface in a thickness direction thereof, wherein
a plurality of cylindrical lenses, each extending in a direction intersecting the end surface, are formed in parallel to each other on the other surface in the thickness direction of the light guide plate, and the adjacent cylindrical lenses are connected by a planar surface.

13. The lighting device according to claim 12, wherein a curved surface of a head of each of the cylindrical lenses is formed in a shape of any of a circle, ellipse, and sine curve.

14. The lighting device according to claim 12, wherein an angle of an arrangement direction of the cylindrical lens with respect to the planar surface is within 0 to 90° except for 45°.

15. The lighting device according to claim 12, wherein the light source is formed of a light emitting diode (LED).

16. The light emitting system according to claim 12, wherein a light diffusion element diffusing outgoing light is provided on the one surface of the light guide plate.

17. The lighting device according to claim 16, wherein the light diffusion element is formed of a diffractive-optical element (DOE) provided on the one surface.

18. The lighting device according to claim 12, wherein a light distribution conversion element is provided on the end surface of the light guide plate.

19. The lighting device according to claim 18, wherein the light distribution conversion element is formed of a diffractive-optical element (DOE) provided on the end surface.

20. The lighting device according to claim 12, wherein a prism sheet is arranged on the one surface of the light guide plate.

21. A liquid crystal display device, comprising:
a light source;
a light guide plate which receives light emitted from the light source through an end surface thereof and outputs the light from one surface in a thickness direction thereof; and
a liquid crystal panel arranged on the one surface, wherein a plurality of cylindrical lenses, each extending in a direction intersecting the end surface, are formed in parallel to each other on the other surface in the thickness direction of the light guide plate, and the adjacent cylindrical lenses are connected by a planar surface.

* * * * *